S. P. Brooks.
Shovel & Sifter.
Nº 71969        Patented Dec. 10, 1867.
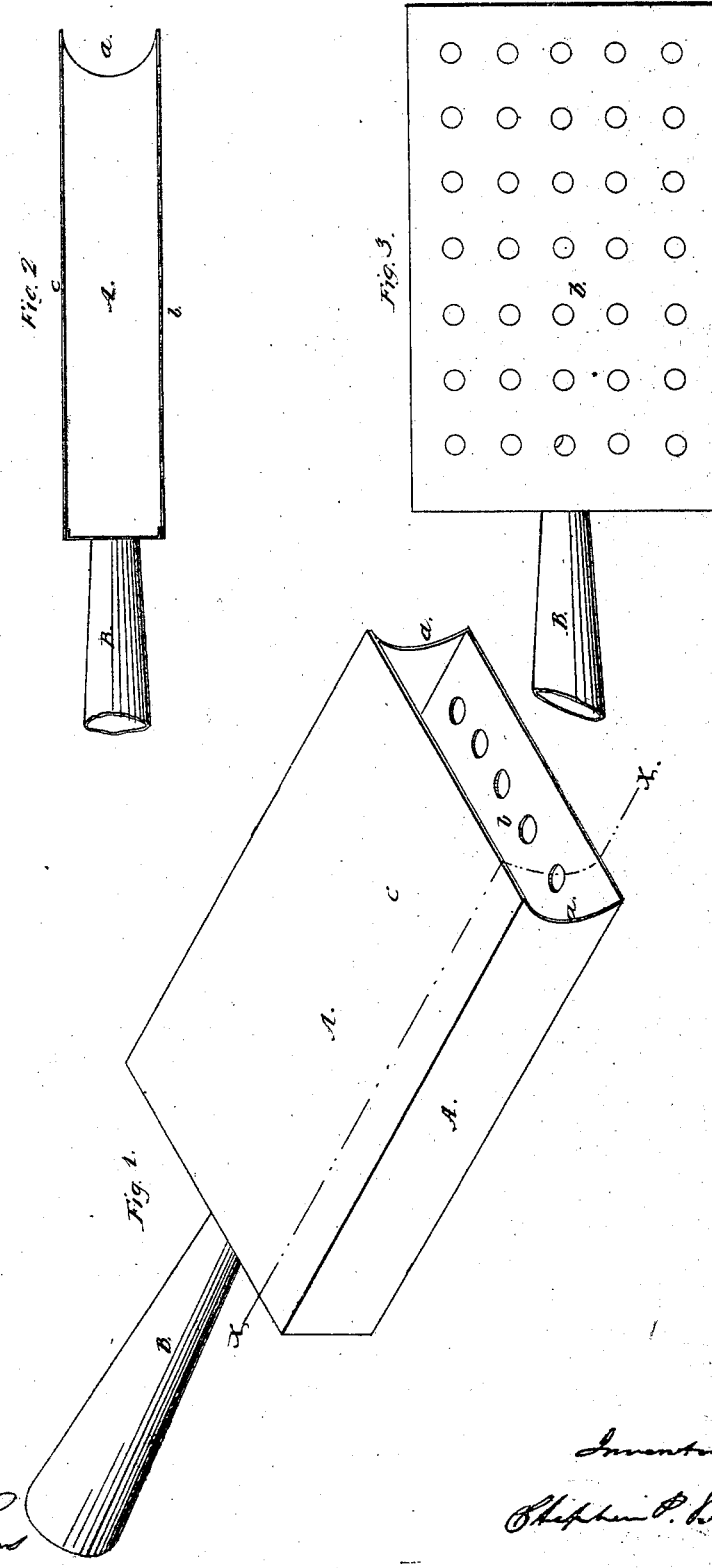

United States Patent Office.

STEPHEN P. BROOKS, OF SOMERVILLE, MASSACHUSETTS, ASSIGNOR TO HIMSELF AND BENJAMIN WOODWARD, OF SAME PLACE.

Letters Patent No. 71,969, dated December 10, 1867.

COMBINED SHOVEL AND SIFTER.

The Schedule referred to in these Letters Patent and making part of the same.

TO ALL WHOM IT MAY CONCERN:

Be it known that I, STEPHEN P. BROOKS, of Somerville, in the county of Middlesex, and State of Massachusetts, have invented an improved Combined Shovel and Coal-Sifter, of which the following is a full, clear, and exact description, reference being had to the accompanying drawings, making part of this specification, in which—

Figure 1 is a perspective view of my combined shovel and sifter.

Figure 2 is a longitudinal vertical section through the same, on the line $x\ x$ of fig. 1.

Figure 3 is a plan of the perforated side which forms the sifter.

The ordinary perforated fire-shovel, which is used to sift the ashes beneath the grate of a stove, is objectionable, on account of its allowing the dust to escape freely into the apartment. My invention has for its object to overcome this difficulty, and consists in a shovel, of rectangular or other suitable form, enclosed all around except at the front end, which is left open for the entrance of the ashes or coal, one side of the shovel being perforated or formed of wire netting, so as to answer the purpose of a sifter.

To enable others skilled in the art to understand and use my invention, I will proceed to describe the manner in which I have carried it out.

In the said drawings, A is the shovel, made of sheet iron, or other suitable material, of a rectangular or other desirable form, and open only at the front end at $a$. One side, $b$, of the shovel is perforated, as seen in the drawings, or may be made of wire netting, so as to serve as a sifter, the opposite side, $c$, acting as a cover to prevent the dust from rising and escaping into the apartment when the shovel is used beneath the grate of a stove, thus particularly adapting it for parlor use; while, by turning the shovel over by means of the handle B, so as to bring the side $c$ underneath, it may be used to remove fine ashes from beneath the grate—a purpose for which the ordinary perforated fire-shovel is not well adapted.

The above-described shovel may be made of any suitable depth, to adapt it for coal or cinders of any size.

Claim.

What I claim as my invention, and desire to secure by Letters Patent, is—

The within-described combined shovel and sifter, constructed and operating substantially as set forth.

S. P. BROOKS.

Witnesses:
P. E. TESCHEMACHER,
N. W. STEARNS.